United States Patent [19]

Aiba

[11] 4,231,046

[45] Oct. 28, 1980

[54] INK ISSUANCE ORIFICE PROTECTION IN AN INK JET SYSTEM PRINTER

[75] Inventor: Masahiko Aiba, Nara, Japan

[73] Assignee: Sharp Kabushiki Kaisha, Osaka, Japan

[21] Appl. No.: 960,030

[22] Filed: Nov. 13, 1978

[30] Foreign Application Priority Data

Nov. 14, 1977 [JP] Japan .................................. 52137002

[51] Int. Cl.$^2$ .............................................. G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 3,737,914 | 6/1973 | Hertz | 346/75 |
| 3,839,721 | 10/1974 | Chen | 346/75 |
| 3,945,021 | 3/1976 | Kraus | 346/75 |
| 4,007,464 | 2/1977 | Bassous | 346/75 |

*Primary Examiner*—Joseph Hartary

*Attorney, Agent, or Firm*—Birch, Stewart, Kolasch & Birch

[57] ABSTRACT

A protection film formation means is disposed in front of an orifice of a nozzle for isolating the orifice from the ambience. A control means function to form a protection film when an ink jet system printer does not operate, and to remove the protection film when the ink jet system printer operates.

8 Claims, 12 Drawing Figures

INK ISSUANCE ORIFICE PROTECTION IN AN INK JET SYSTEM PRINTER

BACKGROUND AND SUMMARY OF THE INVENTION

The present invention relates to an ink issuance system in an ink jet system printer and, more particularly, to a system for preventing the blocking of an orifice of a nozzle due to solidified ink while the ink jet system printer is not in the operative condition.

Generally, in an ink jet system printer, particular attention must be directed to the fact that an orifice of a nozzle will be blocked by solidified ink when the ink jet system printer is not operating. To prevent the occurrence of blocking, ink liquid of minimum evaporation characteristic is employed in the ink jet system printer. However, it is not possible to completely prevent the occurrence of blocking.

A system is proposed, wherein a thin film made of an organic solvent having a high boiling point is formed in front of the orifice of the nozzle to isolate the orifice from the ambience. The thin film is about several tens micron thick, and the ink droplets are emitted through the thin film. In this system, the formation of the thin film of several tens micron thick is very difficult, and the ink drop travel is influenced by the thin film.

Accordingly, an object of the present invention is to provide a novel ink issuance system in an ink jet system printer, which ensures stable operation.

Another object of the present invention is to prevent the occurrence of blocking of an orifice of a nozzle in an ink jet system printer.

Still another object of the present invention is to provide an orifice protection means which ensures stable issuance of ink droplets.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a film formation means is provided for forming a protection film in front of an orifice to isolate the orifice from the ambience when the ink jet system printer does not operate. The film formation means is activated, when the ink jet system printer operates, to remove the protection film, thereby exposing the orifice to the ambience.

Since the protection film is removed from the orifice when the ink jet system printer operates, stable ink drop issuance is achieved. Moreover, the protection film is not necessarily a thin film.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
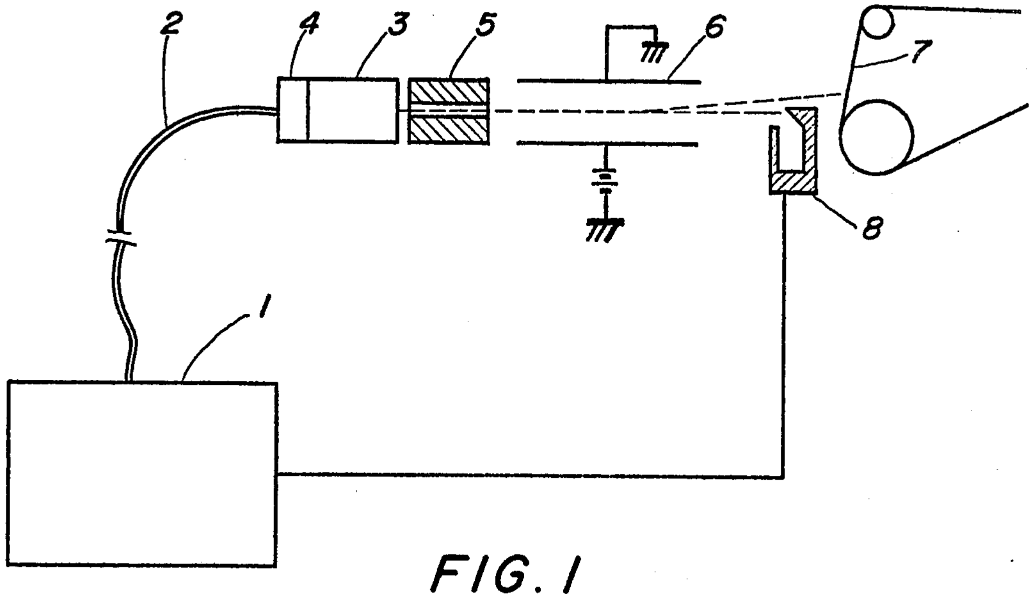
FIG. 1 is a schematic block diagram of a basic construction of an ink jet system printer of the charge amplitude controlling type.

FIG. 1 shows a basic construction of an ink jet system printer of the charge amplitude controlling type.

The ink jet system printer of the charge amplitude controlling type mainly comprises an ink liquid supply system 1 including an ink reservoir for containing ink liquid therein and a pump for supplying the ink liquid to a nozzle 3 through an ink liquid conduit 2 under a predetermined pressure. An ultrasonic vibrator 4 is attached to the nozzle 3 so that ink droplets of a uniform size are emitted from an orifice of the nozzle 3 toward a recording paper 7 at a given frequency.

A charging tunnel 5 is disposed in front of the nozzle 3 in order to charge the ink droplets to desired amplitudes in accordance with print information. The thus charged ink droplets are deflected in accordance with charges carried thereon as they pass through a constant high-voltage electric field established by a pair of deflection electrodes 6, to which a constant high voltage is applied. The thus deflected ink droplets are deposited on the recording paper 7, thereby printing desired symbols in a dot matrix fashion. Ink droplets not contributing to the actual writing operation are not charged nor deflected, and are directed to a beam gutter 8 for recirculation purposes.

Figure 2:
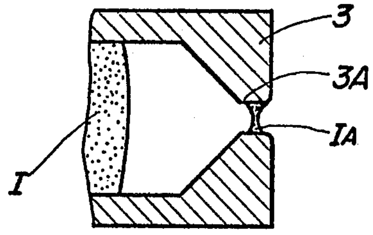
FIGS. 2 and 3 are sectional views of a nozzle employed in the conventional ink jet system printer.
Figure 3:
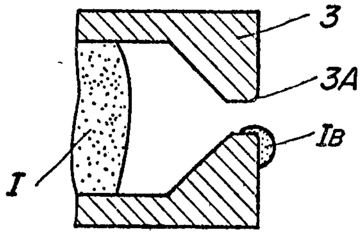

When the writing operation is terminated, the ink liquid supply from the ink reservoir to the nozzle 3 is terminated. FIGS. 2 and 3 show conditions where the ink liquid supply is terminated.

Figure 4:
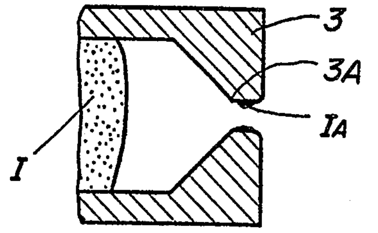
FIGS. 4 and 5 are sectional views showing solidified ink in the conventional ink jet system printer.
Figure 5:
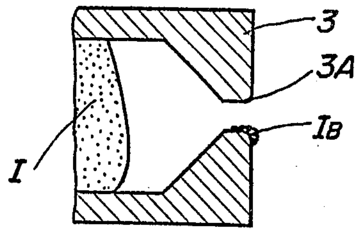

The ink liquid I is filled to the interior of the nozzle 3 but not to the orifice 3A. There is a possibility, in the conventional system that some ink liquid IA or IB remains at or around the orifice 3A. The ink liquid IA or IB will be solidified and fixed to the orifice 3A as shown in FIGS. 4 and 5 while the ink jet system printer does not operate. The thus solidified ink liquid IA or IB will influence the droplet formation when the writing operation is again initiated, or block the orifice 3A.

Figure 6:
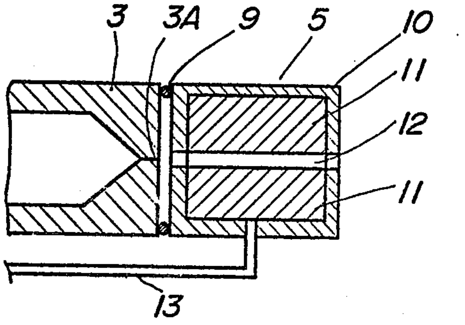
FIG. 6 is a sectional view of an embodiment of an orifice protection system of the present invention.

FIG. 6 shows an embodiment of an orifice protection system of the present invention. Like elements corresponding to those of FIG. 1 are indicated by like numerals.

The orifice protection system of FIG. 6 mainly comprises the nozzle 3 including the orifice 3A, the charging tunnel 5, and an O-shaped ring 9 disposed between the nozzle 3 and the charging tunnel 5 for sealing purposes.

The charging tunnel 5 comprises a charging tunnel housing 10, and a porous metal 11 secured in the charging tunnel housing 10. The porous metal 11 is made of, for example, sintered metal having liquid absorption properties, and functions as an electrode for charging purposes. The charging tunnel housing 10 and the porous metal 11 include an ink droplet passage 12 formed therein for passing the ink liquid emitted from the orifice 3A of the nozzle 3. A conduit 13 is connected to the porous metal 11 for supplying protection liquid to the porous metal 11, and for pumping out the protection liquid from the porous metal 11.

Figure 7:
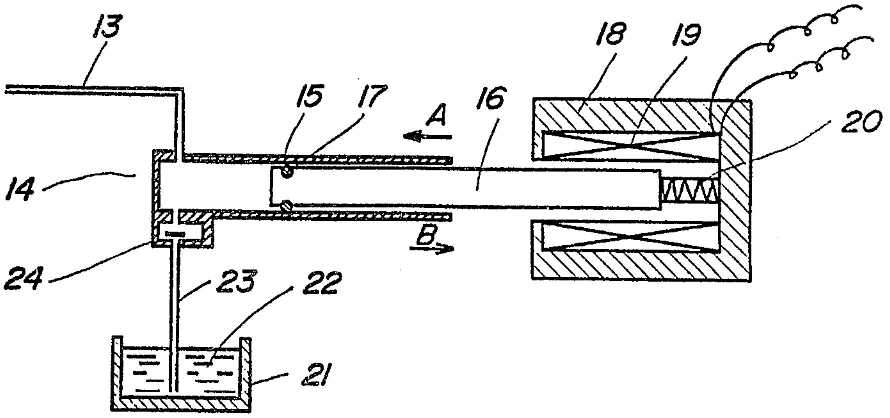
FIG. 7 is a sectional view of a control system connected to the orifice protection system of FIG. 6.

The conduit 13 is connected to a pump system 14 shown in FIG. 7.

The pump system 14 mainly comprises a pump cylinder 15, a piston 16 slidable in the pump cylinder 15, an O-shaped ring 17 for sealing purposes, and a drive mechanism 18 for reciprocating the piston 16.

The drive mechanism 18 includes a coil 19 for attaracting the piston 16 in a direction shown by an arrow B, and a spring 20 for depressing the piston 16 in the counter direction shown by an arrow A. The depression force of the spring 20 is selected smaller than the attraction force created by the coil 19. The coil 19 is activated, when the ink jet system printer is in the operative condition, to attract the piston 16, and the coil 19 is deenergized, when the ink jet system printer does not operate, to shift the piston 16 in the direction shown by the arrow A.

A reservoir 21 contains protection liquid 22 therein. The reservoir 21 is communicated to the pump system 14 through a conduit 23 and a check valve 24.

When the ink jet system printer is in the operative condition, the coil 19 is actuated to attract the piston 16 in the direction shown by the arrow B, thereby creating a negative pressure in the pump cylinder 15. The protection liquid 22 contained in the reservoir 21 is introduced into the pump cylinder 15 through the conduit 23, and the protection liquid contained in the porous metal 11 (see FIG. 6) is returned to the pump cylinder 15 through the conduit 13. Therefore, the orifice 3A is exposed to the ambience through the ink droplet passage 12. That is, the ink droplets emitted from the nozzle 3 travel through the charging tunnel 5 without being influenced by the protection liquid.

When the ink jet system printer is in the nonoperative condition, or when the writing operation is terminated, the coil 19 is disabled and, hence, the piston 16 travels in the direction shown by the arrow A due to the depression force generated by the spring 20. The protection liquid retained in the pump cylinder 15 is supplied to the porous metal 11 through the conduit 13. The protection liquid is not returned to the reservoir 21 because of the provision of the check valve 24.

The protection liquid introduced into the porous metal 11 travels through the porous metal 11 and functions to block the ink droplet passage 12. That is, a liquid film is formed in front of the orifice 3A, whereby the orifice 3A is isolated from the ambience. Therefore, the ink liquid will not be solidified even when some ink liquid remains at or around the orifice 3A as discussed with reference to FIGS. 2 and 3.

The protection liquid is desired to have a minimum evaporation characteristic. Preferred protection liquid is castor oil, glycerin, or a mixture thereof.

Figure 8:
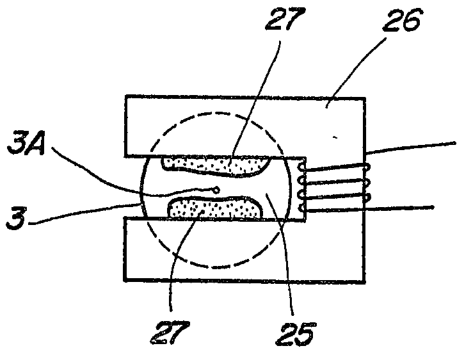
FIG. 8 is a front view of another embodiment of an orifice protection system of the present invention.
Figure 9:
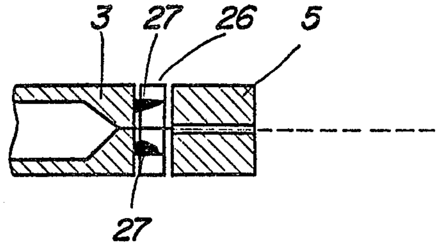
FIGS. 9 and 10 are sectional views showing operation modes of the orifice protection system of FIG. 8.
Figure 10:
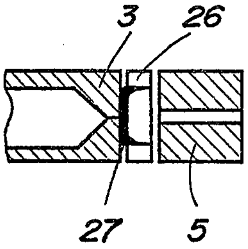

FIGS. 8, 9 and 10 show another embodiment of an orifice protection system of the present invention.

An electro-magnet 26 is disposed between the nozzle 3 and the charging tunnel 5. The electro-magnet 26 includes a passage 25 through which the ink stream travels. Magnetic fluid 27 is secured in the passage 25 to selectively isolate the orifice 3A from the ambience.

More specifically, when the ink jet system printer is in the operation mode, the electro-magnet 26 is energized to attract the magnetic fluid 27 as shown in FIG. 9, thereby exposing the orifice 3A to the ambience. Therefore, the ink liquid issuance will not be influenced by the magnetic fluid 27. When the ink jet system printer does not operate, the electro-magnet 26 is disabled. The magnetic fluid 27 forms a protection film in front of the orifice 3A due to the surface tension thereof as shown in FIG. 10. The orifice 3A is isolated from the ambience and, therefore, the ink liquid will not be solidified around or at the orifice 3A.

Figure 11:
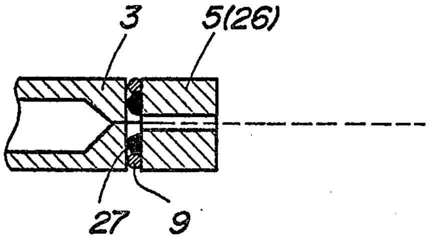
FIGS. 11 and 12 are sectional views of still another embodiment of an orifice protection system of the present invention.
Figure 12:
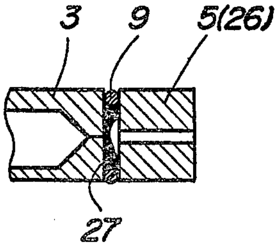

FIGS. 11 and 12 snow still another embodiment of an orifice protection system of the present invention, wherein the electro-magnet 26 is incorporated in the charging tunnel 5.

An O-shaped ring 9 is disposed between the electro-magnet 26 and the nozzle 3 for sealing purposes. The magnetic fluid 27 is secured in a cavity determined by the nozzle 3, the O-shaped ring 9, and the electro-magnet 26. Operation is similar to that of the embodiment of FIGS. 8, 9 and 10. FIG. 11 shows a condition where the ink jet system printer is in the operative mode, and FIG. 12 shows another condition where the ink jet system printer does not operate.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink jet system printer of the charge amplitude controlling type which emits ink droplets from an orifice formed in a nozzle, charges said ink droplets by a charging tunnel in accordance with print information, deflects said charged ink droplets as they pass through a constant high-voltage electric field, and deposits said charged, deflected ink droplets on a record receiving member, thereby printing desired symbols on said record receiving member, the improvement comprising:

film formation means incorporated in said charging tunnel for selectively forming a protection film in front of said orifice in order to isolate said orifice from the ambience; and drive means for activating said film formation means so that said protection film is formed when said ink jet system printer does not operate, and said protection film is removed when said ink jet system printer operates.

2. The ink jet system printer according to claim 1, and further comprising an O-shaped ring disposed between said nozzle and said charging tunnel for sealing purposes.

3. The ink jet system printer according to claim 1 or 2, wherein said charging tunnel comprises a hollow housing, a porous metal member secured in said hollow housing, and a passage formed in said hollow housing and said porous metal member through which said ink droplets travel, and wherein said film formation means comprise means for supplying a protection liquid to said porous metal member in order to form a liquid layer in said passage for isolating said orifice from the ambience.

4. The ink jet system printer according to claim 3, wherein said drive means comprising a pump means for supplying and pumping out said protection liquid to and from said porous metal member.

5. The ink jet system printer according to claim 4, wherein said pump means comprising a piston operatively positioned within a cylinder, said piston being actuated by a coil and spring means to supply and pump out said protection liquid to and from said porous metal member.

6. The ink jet system printer according to claim 1 or 2, wherein said film formation means comprising a magnetic fluid disposed between said orifice and said charging tunnel and an electro-magnet means incorporated in said charging tunnel for selectively forming a protection film in front of said orifice in order to isolate said orifice from the ambience.

7. In an ink jet system printer of the charge amplitude controlling type which emits ink droplets from an orifice formed in a nozzle, charges said ink droplets by a charging tunnel in accordance with print information, deflects said charged ink droplets as they pass through a constant high-voltage electric field, and deposits said charged, deflected ink droplets on a record receiving member, thereby printing desired symbols on said record receiving member, the improvement comprising:

film formation means including an electro-magnet means and a magnetic fluid incorporated between said orifice and said charging tunnel for selectively forming a protection film in front of said orifice in order to isolate said orifice from the ambience; and drive means for deactivating and activating said electro-magnet means so that said protection film is formed by said magnetic fluid when said ink jet system printer does not operate, and said protection film is removed when said ink jet system printer operates, respectively.

8. In an ink jet system printer according to claim 7, wherein said electro-magnet means including a passage therethrough and said magnetic fluid being attracted to an inner surface of said passage to form an opening when said electro-magnetic means is actuated, and said passage being closed by said magnetic fluid when said electro-magnetic means is deactuated.

* * * * *